United States Patent [19]

Zytka

[11] 4,065,710
[45] Dec. 27, 1977

[54] SUBSTITUTE POWER SUPPLY AND BATTERY CHARGER FOR BATTERY OPERATED APPARATUS

[76] Inventor: Bernard J. Zytka, 1492 Great Oak Drive, Pittsburgh, Pa. 15220

[21] Appl. No.: 689,581

[22] Filed: May 24, 1976

Related U.S. Application Data

[63] Continuation-in-part of Ser. No. 607,107, Aug. 25, 1975, abandoned, which is a continuation-in-part of Ser. No. 538,321, Jan. 3, 1975, abandoned.

[51] Int. Cl.² ........................................ H02J 7/00
[52] U.S. Cl. .................................... 320/2; 307/66; 339/152
[58] Field of Search ........................ 320/2–5, 320/25, 26; 307/64, 65, 66, 150; 46/45; 339/152

[56] References Cited

U.S. PATENT DOCUMENTS

| | | | |
|---|---|---|---|
| 3,586,870 | 6/1971 | Cwiak | 320/2 X |
| 3,733,533 | 5/1973 | Fulkerson | 320/2 |
| 3,743,915 | 7/1973 | Struck | 320/2 |

Primary Examiner—Robert J. Hickey
Attorney, Agent, or Firm—A. G. Williamson, Jr.

[57] ABSTRACT

Terminal plates, connected to the opposite terminals of a direct current (DC) source, are mounted and/or formed to be engageable with the terminals of the operating batteries in a battery operated device. Two terminal plates are mounted on disc shaped insulation pieces or are formed into conducting discs to match the conventional battery shape. These terminal discs are inserted into the battery compartment at opposite ends of the normal batteries in series and with like polarities matching. Selection of the position of an insulating pad or disc surface results in the external source acting as a substitute power supply or as a charging source for rechargeable cells. In a special form, the terminal plates are mounted on opposite sides of a single insulation disc, connected to the DC source, and the disc inserted between tandem cells or between the end cell and compartment contactor to provide operating energy to the device.

11 Claims, 13 Drawing Figures

SUBSTITUTE POWER SUPPLY AND BATTERY CHARGER FOR BATTERY OPERATED APPARATUS

BACKGROUND OF THE INVENTION

This application is a continuation-in-part of my co-pending application, Ser. No. 607,107, filed Aug. 25, 1975, now abandoned, which in turn was a continuation-in-part of my original application, Ser. No. 538,321, filed Jan. 3, 1975, and now abandoned.

My invention pertains to a substitute power supply and battery charger for battery operated apparatus. More specifically, an external direct current (DC) power source energized from the commercial power supply is substituted into battery operated devices by means of a unique circuit element to supplement exhausted dry cell batteries or to recharge reusable battery cells normally used.

One disadvantage in dry battery operated devices, especially games and toys, is the need for frequent replacement of exhausted cells if the device is used frequently and/or consistently. This is not only an aggravation, but an expense. There is a need for a simple arrangement which can substitute for batteries as an operating energy source in battery operated devices. Such an arrangement must operate with the dry cells in place, exhausted or not. It must supply an equivalent voltage with the same polarity from a simple, economical, and easily obtainable external DC source. The arrangement must be simple and relatively foolproof to use. Another problem, with relatively unsophisticated battery operated devices, is to obtain a simple, easy to use charging arrangement when rechargeable batteries are used. Preferably, this charging apparatus should be usable with the battery cells in place in the device to eliminate a separate charging rack or mounting. Both forms should use the commercial power as the ultimate source of energy through a rectifier unit.

Accordingly, an object of my invention is a substitute power supply for battery operated devices.

Another object of the invention is a circuit device, connected to a source of DC energy, which can be inserted in the compartment with the battery cells of a batter operated device to supply operating energy.

It is also an object of my invention to provide a charging arrangement for rechargeable batteries in a battery operated device comprising simple circuit elements insertable within the battery compartment to connect an external DC source to charge the batteries.

Still another object of the invention is a circuit element for insertion between battery cells and with terminals on each side connected to an external DC source for supplying operating energy when said batteries are exhausted.

A further object of my invention is a pair of circuit elements for insertion in the battery compartment of a device, one element with insulation which may be selectively positioned to connect an external DC source to substitute for the normally used batteries or to charge the normally used rechargeable cells.

A still further object of the invention is a battery charging arrangement for a battery operated device connectable to rechargeable battery cells while positioned within the normal battery compartment.

Another object of the invention is a circuit element arrangement which may be used, with only a single ajustment, to supply power from an external source both to substitute for exhausted battery cells or to charge rechargeable battery cells in a battery operated device.

Other objects, features, and advantages of the invention will become apparent from the following specification and accompanying drawings when taken with the appended claims.

SUMMARY

In the first arrangement of my invention, I supply a disc of any common dielectric material with a minimum thickness and of a diameter equivalent to that of the dry battery cells used in the battery operated device, e.g., a toy or game. A terminal on each side of the disc is positioned to contact the terminals on adjacent tandem battery cells or the battery compartment terminals within the device. The disc terminals are connected to a source of DC energy, normally a transformer-rectifier unit supplied from the commercial power. This unit provides a DC voltage equivalent to the battery voltage used. The terminals of the disc are preferably formed to distinguish the DC polarity on each. When placed or inserted between or in series with the cells of the battery within the device, DC energy is supplied to operate the device even though the normal battery cells are exhausted. By supplying a second disc, having only a single terminal, and providing a plug type connection between that terminal and a selected terminal, e.g., negative, of the first disc, a charging arrangement for rechargeable batteries in a device is provided. The discs in this case are inserted at each end of the battery compartment so as to isolate the batteries from the unit operating circuit. Proper choice of polarity provides charging energy.

In a second form of the invention, the contact discs are made of a metallic conductive material, e.g., brass, and a pair of these discs are required for all uses. Each disc is formed to fit over the end of a battery cell, of any of the various sizes conventionally used, both dry and rechargeable cells. In other words, there is a different size disc for each different size battery. Another element is a disc or pad of insulating material, of substantially the same size as the disc with which used. Preferably, this insulating pad is made of material which will adhere to either surface or face of the disc. The pair of contact disc is connected by a pair of wire leads to the source of DC energy. The discs are fitted over the battery cells at each end terminal of the battery compartment, that is, over the outer ends of the battery cells in series. If the insulation pad is placed between the negative battery terminal and the contact disc, to interrupt the circuit connection to the battery supply, the external source then supplies operating energy to the device. If the insulation pad is positioned between the negative contact disc and the terminal contactor of the compartment, interrupting the supply circuit to the device load, the external source supplies charging energy to the batteries.

BRIEF DESCRIPTION OF THE DRAWINGS

I shall now describe in greater detail two forms of apparatus embodying my invention, referring to the accompanying drawings in which.

In each of the drawings, similar references designate the same parts of the apparatus.

DESCRIPTION OF THE ILLUSTRATED EMBODIMENTS

Figure 1:
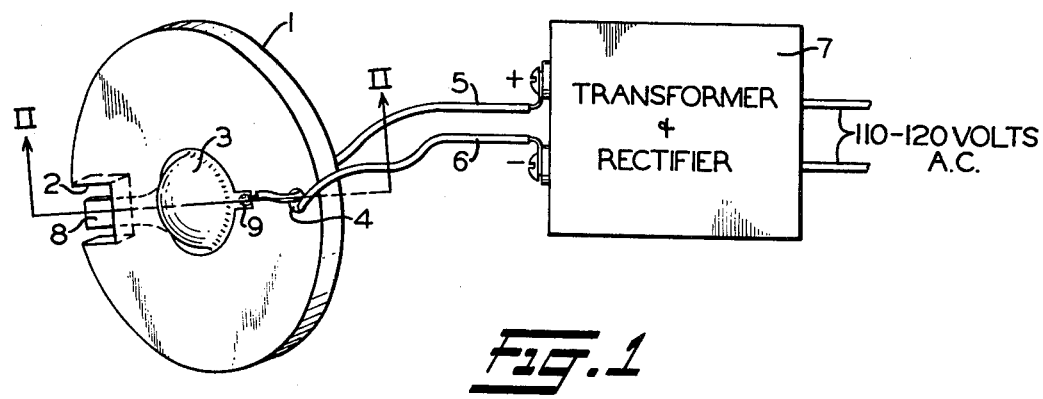
FIG. 1 is a schematic illustration of a substitute power supply embodying the features of the first form of the invention.
Figure 4A:
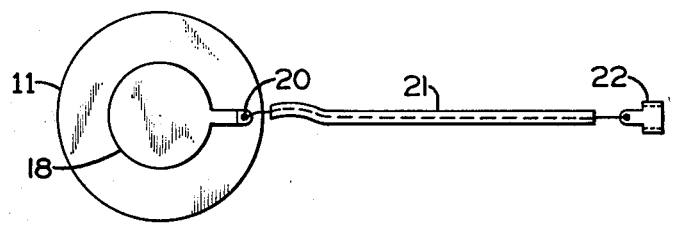
FIG. 4A is a diagrammatic illustration of a second disc element used in recharging apparatus embodying the first form of the invention.

Referring to FIG. 1, illustrating the first form of my invention, there is shown schematically a circular disc 1 formed of dielectric material, e.g., plastic, with a notch 2. On the near face or surface of disc 1, a terminal plate 3 is seated in the center as shown in the cross section of FIG. 2, which is taken along the line II—II in FIG. 1. Terminal 3 is also formed to raise above the surface of disc 1 to distinguish from the flat terminal plate 8 seated on the opposite face. In some ways, terminal 3 may be described as shaped similar to the positive terminal on conventional dry batteries used in flash lights, for example. Terminal 8, although generally circular, has a spade shaped lug extending into notch 2 (FIG. 2) to provide the plug portion of a quick disconnect type circuit connection to an external lead, as will be explained later with FIG. 5. Wire leads 5 and 6 are soldered to terminals 3 and 8 at points 9 and 10, respectively. As specifically shown, leads 5 and 6 are fed through a hole 4 in disc 1 to provide a measure of protection against breaking the solder connections. Alternately, terminal plates 3 and 8 may have extension fingers to the edge of the disc at which points leads 5 and 6 are soldered direct without being fed through a hole 4. An example of this construction is shown in FIG. 4A. As another alternate construction, the disc ends of wires 5 and 6 and the solder joints 9 and 10 may be molded into the material forming the disc body. This will hold the leads firmly and prevent breaking the solder joints.

Wires 5 and 6 are connected at their other ends in any conventional manner to the positive (+) and negative (−) output terminals, respectively, of a transformer-rectifier unit 7. The input terminals of unit 7 are connected to the commercial alternating current supply, i.e., nominally 110 volts at 60 Hz. Unit 7 reduces this voltage and converts it to a direct current (DC) output voltage of the required level for the device to be operated. As an example, unit 7 may be a transformer-rectifier apparatus such as used for model railroads.

Figure 2:
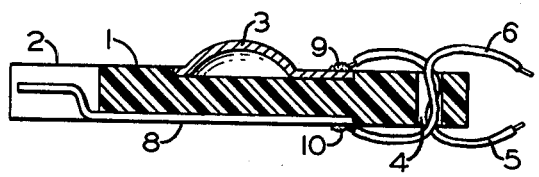
FIG. 2 is a cross section of the disc circuit element of the FIG. 1 arrangement taken along line II.
Figure 3:
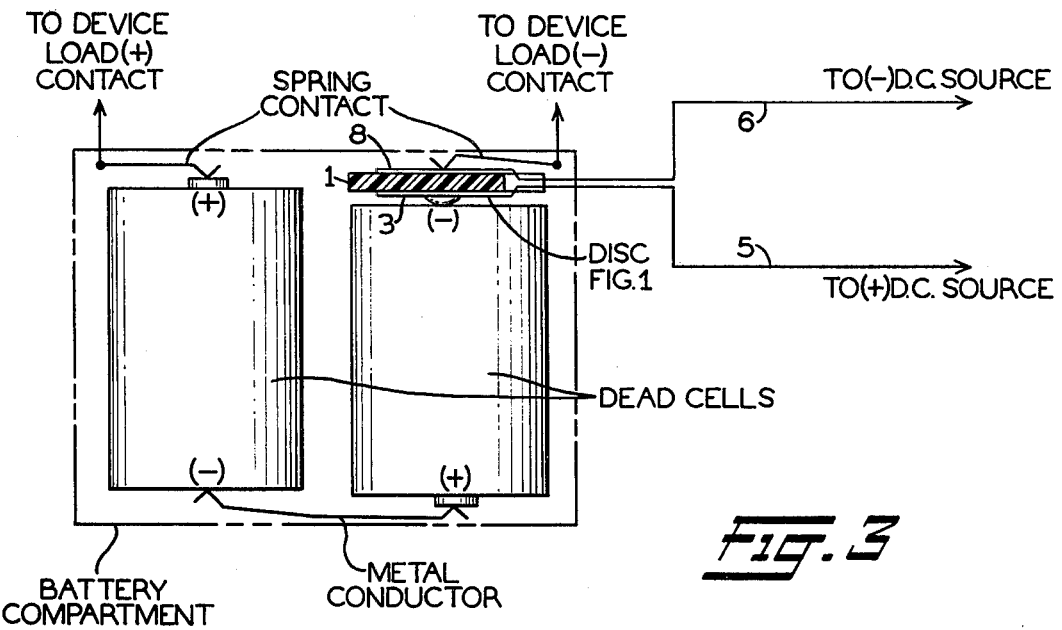
FIG. 3 is a diagrammatic illustration of one manner of using the substitute power supply arrangement of FIG. 1.

One manner of using the circuit apparatus of FIGS. 1 and 2 is shown in FIG. 3. The dot-dash box represents the battery compartment of the battery operated device or apparatus, e.g., a toy or game. Within the compartment, block symbols designate two dry battery cells, e.g., of the popular D size, connected in series by the various spring contacts or conductors which engage the battery terminals in a conventional manner. The two battery cells are noted as being dead or exhausted, that is, incapable of sufficient output to operate the apparatus. Disc 1 is shown inserted between the (−) terminal of the right battery cell and the compartment terminal contact connected to the (−) lead of the device operating means and is positioned to aid the battery voltage. In other words, terminal plate 3 is contacting the (−) terminal of the right battery cell while terminal plate 8 contacts the compartment (−) spring contact. Thus the voltage from the external source 7 over leads 5 and 6 adds, in series, to the weak battery output and supplies sufficient energy to operate the device. If the battery compartment is of such shape that the cells are positioned in tandem to complete the series circuit, disc 1 may be inserted between the two cells with terminal plate 3 contacting the (−) plate of one cell and terminal plate 8 contacting the (+) plate or terminal of the other cell.

Figure 4B:
FIG. 4B is a cross section of the disc of FIG. 4A.
Figure 5:
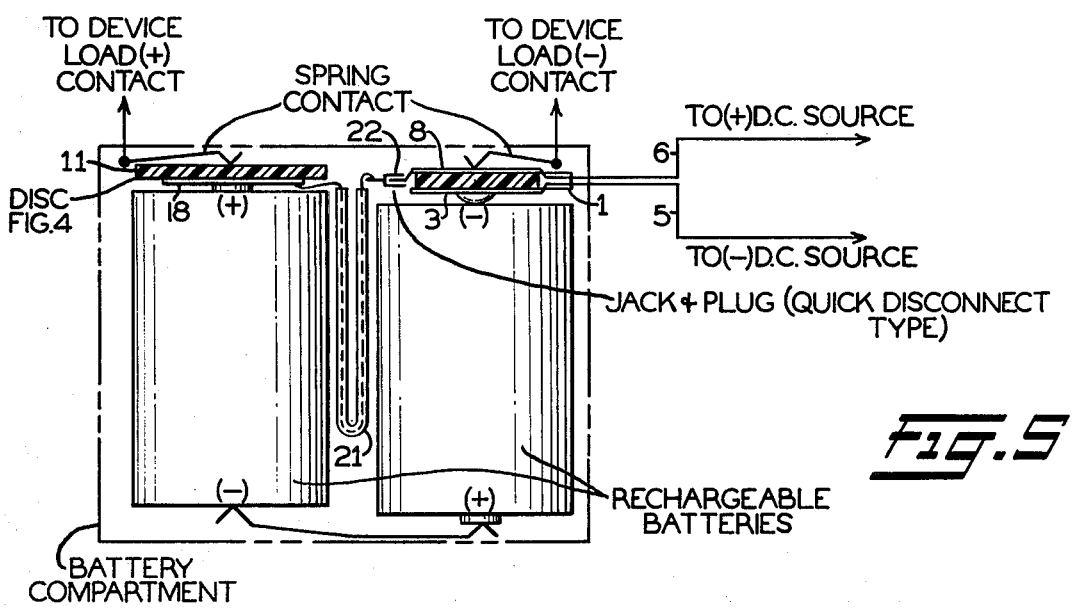
FIG. 5 is a diagrammatic illustration of one manner of using the pair of discs of FIGS. 1 and 4A as a charging arrangement for rechargeable batteries.

An arrangement for charging rechargeable battery cells when such are used in the battery operated apparatus/device is shown in FIGS. 4A, 4B, and 5. The disc 11 shown in plan view in FIG. 4A is similar to the basic disc element of FIG. 1. That is, it is made of dielectric material and of a size (diameter and thickness) to fit into the battery compartment between a cell and the spring contact at the end of the compartment. However, only one terminal plate 18 is used, flat and secured to one face as illustrated in the cross section view of FIG. 4B. A wire lead 21 is soldered to plate 18 at point 20. This lead has a length preselected in accordance with the intended use and a jack portion 22 of the quick disconnect type coupler is secured to its other end. This coupler 22 engages the lug on plate 8 of disc 1, FIG. 1, to provide a quick circuit connection from plate 8 to plate 18.

One manner of using discs 1 and 11 to provide a charging arrangement is shown in FIG. 5. It is to be noted that, as specifically shown, wires 5 and 6 from disc 1 are now connected to the (−) and (+) output terminals, respectively, of unit 7, reversed from the polarities of FIG. 1. Again, the dot-dash block represents the battery compartment of the apparatus in which are located two rechargeable battery cells shown in block outline. These cells are connected in series to normally supply operating energy to the device. Disc 1 is inserted between the (−) terminal of the right cell and the associated spring contact terminal of the compartment so that terminal plate 3 contacts the (−) plate of the battery while plate 8 contacts the associated spring contact. Disc 11 is inserted between the (+) terminal of the other cell and the spring contact at the other end of the compartment. Disc 11 is positioned so that plate 18 contacts the battery (+) terminal while the insulated face forces the spring contact away to interrupt the normal battery supply circuit to the device. The lug of plate 8 is inserted into jack 22 of lead 21 so that plates 8 and 18 are inter-connected. Energy from DC source 7 is thus applied to charge the battery cells but no energy is supplied to the device normally operated by the batteries.

In an alternate arrangement to FIG. 5, the usual external source connections of leads 5 and 6 are retained as shown in FIG. 1. Disc 1 is then inserted between the left battery cell and the compartment spring contact, with plate 3 in contact with the (+) battery terminal. Disc 11 is inserted between the right cell and the other compartment spring contact with plate 18 in contact with the (−) battery terminal. Lead 21 is connected as before. The supply circuit to the device is interrupted at the insulated face of disc 11 and charging energy is supplied by source 7 to the batteries in series.

It is also to be noted that if both discs are reversed in the arrangement of FIG. 5, operating energy is supplied to the device and the batteries are eliminated from the circuit. This arrangement may be used with dry type battery cells, if both discs are available, to avoid any crystallization effect or corrosion due to heavy current flow through dead dry cell batteries.

Figure 6:
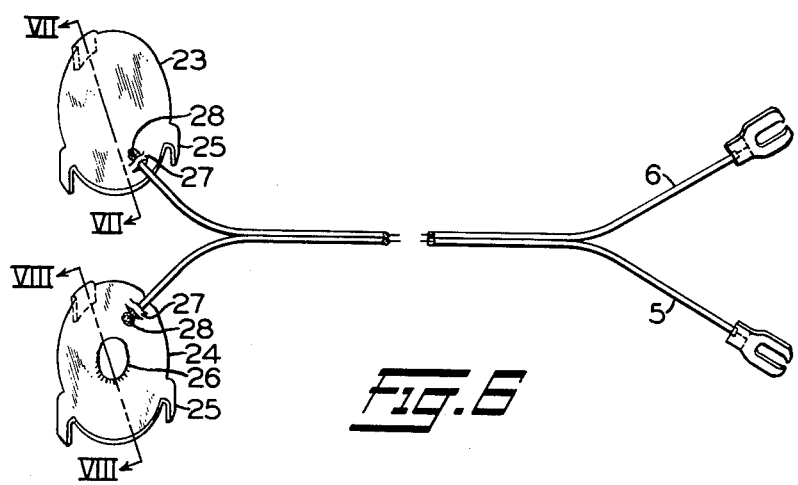
FIG. 6 is a schematic illustration of a substitute power supply, battery charger embodying the second form of the invention.
Figure 7:
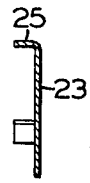
FIG. 7 is a cross section of one disc element of FIG. 6, taken along line VII.
Figure 8:
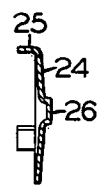
FIG. 8 is a cross section of the other disc element of FIG. 6 taken along line VIII.

Referring now to FIG. 6, a second form of the invention is illustrated which comprises basically two metallic discs 23 and 24. Each is made of a conductive material, e.g., brass, copper, aluminum. Each disc is circular in form, having a diameter selected to match the battery cells with which it will be used. To fit over the end of a battery of conventional size and shape and hold in position, each disc is formed with lugs, such as reference 25, positioned at about 90° to the outer surface. This fitting over a battery cell is shown more specifically in FIGS. 11 and 12. Each disc is shown as having three such lugs but this is not critical. As shown in the cross section drawing FIG. 7, disc 23 is flat on both surfaces except for the lugs 25. The cross section of disc 24 in FIG. 8 illustrates this disc has a formed portion 26 to fit over the positive (+) terminal on conventional battery cells. Discs 24 and 23 thus represent the positive and negative input discs, respectively, of the supplemental power supply apparatus. For convenience hereinafter, the surface of each disc toward the lugs, i.e., to the left in the cross section drawings, is defined as the inner face. The other surface, i.e., to the right in FIGS. 7 and 8, is designated the outer face.

The discs are connected to the external DC source by wire leads 5 and 6. These are shown as a single pair cord, split at each end to allow individual connections. Spade type terminals are crimped or soldered to the outer ends to provide easy connection to the source output terminals. Each disc has a split portion 27 to hold and retain the corresponding wire lead by gripping the insulation. The actual wire is soldered to the outer face of the disc. Since leads 5 and 6 are connected to the positive and negative discs, respectively, lead 5 will normally be connected to the positive output terminal of the rectifier unit 7 partially shown in FIGS. 11 and 12.

Figure 9:
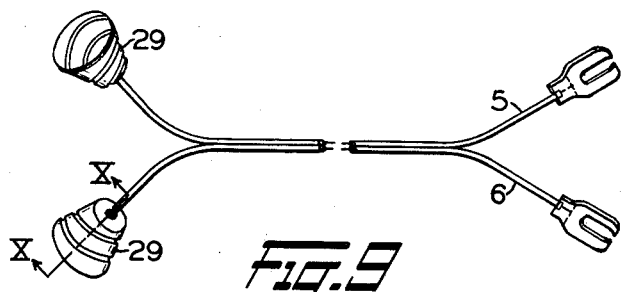
FIG. 9 is another arrangement of the form of the invention in FIG. 6 using a different style of battery terminal contactors.
Figure 10:
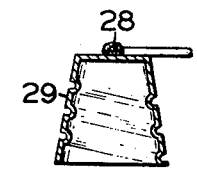
FIG. 10 is a cross section of the contactor of FIG. 9 taken along line X.

A modified arrangement of this second form of the apparatus is shown in FIG. 9. This specific arrangement is for use with a lantern type battery, which typically have a square block shape with conical, spring-like output terminals. The connectors 29 are shaped as truncated cones (see FIG. 10 cross section) to screw or push onto the battery terminals. This specific arrangement of FIG. 9 is limited to use for charging rechargeable lantern batteries of the type described.

Figure 11:
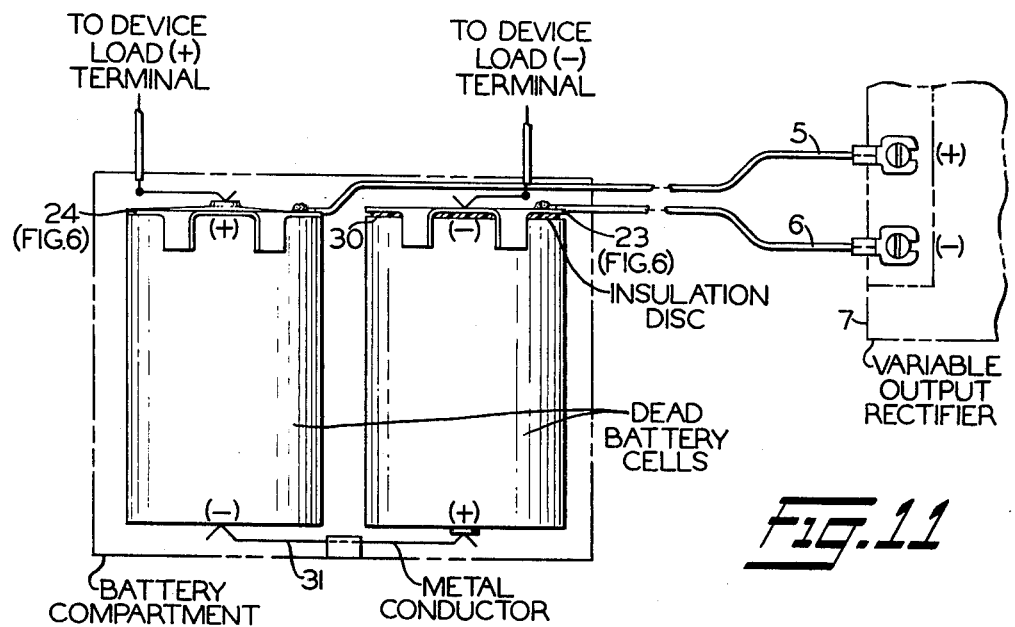
FIG. 11 is a diagrammatic illustration of one connection of the power supply arrangement of FIG. 6 when used as a substitute power supply.

FIG. 11 illustrates the use of this second form (FIG. 6) as a substitute power supply for exhausted dry cells.

The spade terminals at the outer ends of leads 5 and 6 are connected to the positive (+) and negative (−) output terminals, respectively, of the rectifier unit 7. This is similar to the rectifier connections for the same leads in FIG. 3. However, in this form, leads 5 and 6 are so connected regardless of the intended use. In the conventionally shown battery compartment, the dry battery cells, connected in series, are physically adjacent to each other. However, this positioning is immaterial as it will become obvious that the same results can be achieved even if the battery cells are positioned in tandem.

Disc 24 is placed over the (+) battery terminal at one end of the series cells. The projection 26 fits over the conventional + battery terminal and thus assures a good connection with the spring type contactor leading to the (+) terminal of the device load. An insulating disc or pad 30 is placed on the inner face of disc 23 before this disc is positioned on the (−) battery terminal. By way of example, this pad may be a circular piece of vinyl electrical insulating tape which adheres to the surface of disc 23. The pad is cut to substantially the same size as the disc surface. As will be seen shortly, it may be positioned to adhere to either face in accordance with the type of operation desired. The spring contactor leading to the (−) terminal of the device load completes the circuit through the outer face of disc 23. The dead battery cells, however, are excluded from the power supply network by the insulated pad 30 interrupting the circuit at the (−) battery terminal. Energy to operate the device load is thus supplied entirely by the rectifier through the circuit network established by discs 23 and 24 and leads 5 and 6.

Figure 12:
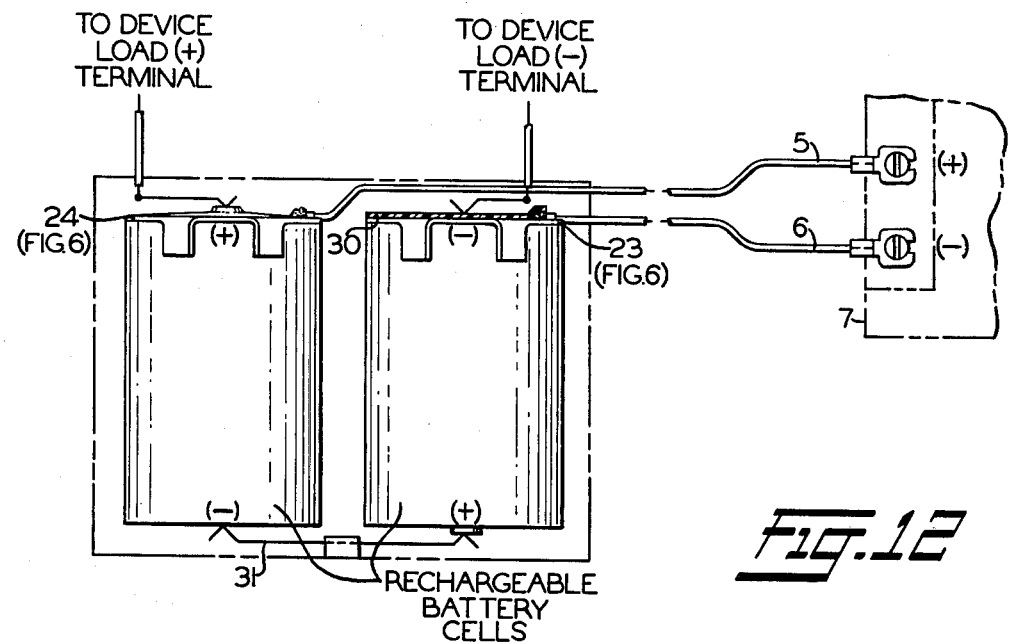
FIG. 12 is another diagrammatic illustration of the connections to use the arrangement of FIG. 6 as a battery charger.

To convert to a battery charger, insulation pad 30 is moved from the inner to the outer face of the (−) disc 23, as shown in FIG. 12. The (+) disc 24 remains positioned as described for FIG. 11. Disc 23 is also positioned as before, but now its inner face makes contact with the (−) terminal of the battery cell. The contactor spring leading to the device load now bears against pad 30. The load circuit is therefore interrupted and no operating energy is supplied. A circuit does exist from the (+) output terminal of rectifier 7 through lead 5, disc 24, the battery cells in series from (+) to (−) terminals, disc 23, and lead 6 to the (−) terminal of the rectifier. Charging energy is thus supplied to the rechargeable battery cells.

The arrangement of my invention thus provides, in a first instance, a substitute power supply for battery operated apparatus or devices. Each form is of simple construction, easy to use, and provides economy in operating the device. Replacement of exhausted dry cells, an inconvenience and costly, is at least greatly reduced if not eliminated. In the second instance, the arrangements of the invention provide charging apparatus for rechargeable cells in a battery operated device. This apparatus is also simple to use, economical to make, and effective and efficient in operation.

Although I have herein shown and described but two forms of the substitute power supply and battery charger of my invention, it is to be understood that various changes and modifications within the scope of the appended claims may be made without departing from the spirit and scope of my invention.

Having thus described the invention, what I claim is:
1. An external power supply arrangement for battery operated apparatus, comprising in combination, a. a first and a second contactor element, each formed for contacting a battery terminal when inserted within said battery operated apparatus,
b. a connecting means for coupling said first and second contactor elements to opposite polarity terminals of an external direct current source, and
c. an insulating means formed for inserting within said battery operated apparatus adjacent one of said first and second contactor elements,
d. energy being supplied by said source to operate said apparatus or to charge the operating batteries within said apparatus as said insulating means is selectively placed adjacent a first or a second surface, respectively, of said one contactor element.

2. A power supply arrangement as defined in claim 1 in which,
a. each contactor element is a conductive disc formed to fit against a different selected polarity battery terminal within said apparatus,
b. said connecting means connects each disc to the same polarity source terminal as the battery terminal that disc is formed to fit, and
c. said insulating means is shaped and sized to match the single selected one of said discs to which it is placed adjacent.

3. A power supply arrangement as defined in claim 2 in which,
a. each conductive disc is futher distinctly formed to fit over a particular battery terminal end to assure the proper polarity connections between said source and said batteries, and
b. said insulating means is a disc shaped piece of electrical insulation tape substantially the same size as the surface of said selected one disc and adapted to adhere to the disc surface selected for insulation to interrupt a selected circuit path within said apparatus.

4. A power supply arrangement as defined in claim 1 in which,
a. each contactor element is formed on a dielectric disc sized to fit within said apparatus in tandem with the operating batteries,
b. a contactor terminal is mounted on each surface of a selected one of said discs,
c. a contactor terminal is mounted on only one surface of the other disc,
d. said connector means connects both terminals on said one disc to opposite polarity terminals of said source and connects said single terminal on said other disc to a selected terminal on said one disc,
e. said insulation means comprises the surface of said other disc free of any terminal, and
f. said other disc is positioned so that the insulation surface interrupts the energy supply circuit to said apparatus or to the operating batteries as said source is to supply charging energy to said operating batteries or operating energy to said apparatus, respectively.

5. A circuit element for use in battery operated apparatus, comprising,
a. a conductive disc of a size enabling insertion within the battery compartment of said apparatus and having a formed terminal for coupling with a preselected terminal of the apparatus batteries,
b. a circuit connector means for connecting said disc to a preselected terminal of an external direct current source, and c. an insulation pad of substantially the same size as said disc and selectively adhered to one surface of said disc for interrupting the coupling between said disc and said apparatus battery and to the other surface of said disc for interrupting the circuit between said disc and said apparatus.

6. A circuit element as defined in claim 5 in which,
a. said conductive disc is formed with a plurality of lugs at substantially right angles to the disc surfaces for clamping the disc to the end of a battery to couple with said selected terminal, and
b. said insulation pad is formed of electrical insulating tape having an adhesive surface to adhere the pad to the selected surface of the conductive disc.

7. A battery charging arrangement for battery operated apparatus, having normal operating batteries mounted in a compartment within the apparatus, comprising in combination,
a. a pair of contact devices, sized for insertion within said compartment in tandem with the operating batteries, and fitted to contact different terminals of said batteries when inserted in said compartment,
b. means for connecting said contact devices to opposite terminals of an external direct current source, and
c. an insulation disc, of the same size as each contact device, selectively positioned on one of said devices for interrupting the energy supply circuit to said apparatus, whereby energy from said source is supplied to charge the operating batteries.

8. A battery charging arrangement as defined in claim 7 in which,
a. each device is an electrically conductive disc of a size and shape matching the end terminal of the batteries in use in said apparatus and formed with a plurality of lugs substantially at right angles to the disc surfaces for clamping the disc to the end terminal of the battery,
  1. each disc of the pair also uniquely formed to designate the polarity of the battery terminal with which it is to be coupled, and
b. said insulation disc is formed of electrical insulating tape having an adhesive surface for securing the disc to the selected surface on said one conductive disc to interrupt the apparatus energy supply circuit.

9. A battery charging arrangement as defined in claim 8 in which, said insulation disc is secured instead to the opposite surface of said one conductive disc for interrupting the energy supply circuit from said operating batteries, whereby operating energy for said apparatus is then supplied by said source.

10. An energy supplying network for battery operated apparatus, comprising in combination,
a. a dielectric disc sized for insertion within the battery compartment of said apparatus in tandem with the operating battery cells and having a terminal on each surface positioned for contacting the adjacent battery and compartment terminals when inserted at one end of said compartment,
b. a second dielectric disc also sized for insertion within said battery compartment and having a terminal on only one surface,
  1. said second disc inserted at the other end of said battery compartment so positioned that said one terminal contacts the corresponding operating battery terminal and the other surface interrupts the energy supply circuit to said apparatus, c. a circuit connector means connected to the terminal on said second disc and adapted for coupling to a selected terminal on said first disc, d. an external source of direct current energy, and e. each terminal on said first disc connected to a selected polarity terminal of said source for supplying charging energy to the operating batteries of said apparatus between the non-selected terminal of said first disc and the one terminal of said second disc.

11. An energy supply network as defined in claim 10 in which,
   a. the positioning of said second disc as inserted at said other end of said battery compartment is reversed so that said one terminal contacts the corresponding apparatus load terminal and the other surface interrupts the circuit from said operating batteries, and
   b. the positioning of said first disc as inserted in said compartment is also reversed so that energy from said source is directly supplied as operating energy to said apparatus.

* * * * *